(12) United States Patent  
Rochester, III

(10) Patent No.: US 7,616,927 B2  
(45) Date of Patent: Nov. 10, 2009

(54) METHOD AND APPARATUS TO REDUCE MULTIPATH EFFECTS ON RADIO LINK CONTROL MEASUREMENTS

(75) Inventor: Lloyd Richard Rochester, III, Lafayette, CO (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 997 days.

(21) Appl. No.: 10/832,890

(22) Filed: Apr. 27, 2004

(65) Prior Publication Data

US 2005/0239410 A1   Oct. 27, 2005

(51) Int. Cl.  
*H04B 17/00* (2006.01)

(52) U.S. Cl. ............... 455/67.11; 455/436; 455/442; 455/522; 375/224; 375/227; 375/228; 702/57; 702/60; 702/75; 702/81; 702/84

(58) Field of Classification Search ......... 455/436–444, 455/522  
See application file for complete search history.

(56) References Cited

U.S. PATENT DOCUMENTS

| | | | |
|---|---|---|---|
| 5,513,380 A * | 4/1996 | Ivanov et al. ............... 455/441 |
| 6,577,965 B1 * | 6/2003 | Morcillo Martinez ........ 702/76 |
| 6,625,589 B1 * | 9/2003 | Varma et al. ................. 706/45 |
| 6,704,353 B1 * | 3/2004 | McCarty et al. ............. 375/227 |
| 6,763,244 B2 * | 7/2004 | Chen et al. ................... 455/522 |
| 6,816,729 B1 * | 11/2004 | Halonen ..................... 455/436 |
| 6,819,935 B2 * | 11/2004 | Kenney et al. ............... 455/522 |
| 6,912,496 B1 * | 6/2005 | Bhattacharya et al. ...... 704/228 |
| 7,251,267 B2 * | 7/2007 | Panchal et al. .............. 375/148 |
| 2002/0105961 A1 * | 8/2002 | Hottinen et al. ............. 370/442 |
| 2007/0191013 A1 * | 8/2007 | Gunnarsson et al. ........ 455/438 |

OTHER PUBLICATIONS

The Cooper Union, EE000 MATLAB Seminar; Median and Rank-Order Filters; Mar. 23, 2004.

* cited by examiner

*Primary Examiner*—Duc Nguyen  
*Assistant Examiner*—Zhiyu Lu  
(74) *Attorney, Agent, or Firm*—Coats & Bennett, P.L.L.C.

(57) ABSTRACT

One or more median filter circuits are used to filter radio link control measurements corresponding to one or more radio link parameters of interest, such as received signal quality or round trip delay measurements, such as might be used by a base station to trigger mobile station handoff. As such measurements are particularly susceptible to measurement outliers arising from rapid but short-lived changes in radio link propagation paths, for example, the application of median filtering to such measurements is particularly advantageous. That is, by operation of median filtering, which is a non-linear filtering process, outliers in a stream of control measurements, such as are caused by instantaneous changes in channel fading or other propagation phenomena, are discarded rather than averaged in with the other measurements. Non-linear filtering as implemented by exemplary median filtering does not impair or otherwise limit the bandwidth of the underlying control measurements.

33 Claims, 4 Drawing Sheets

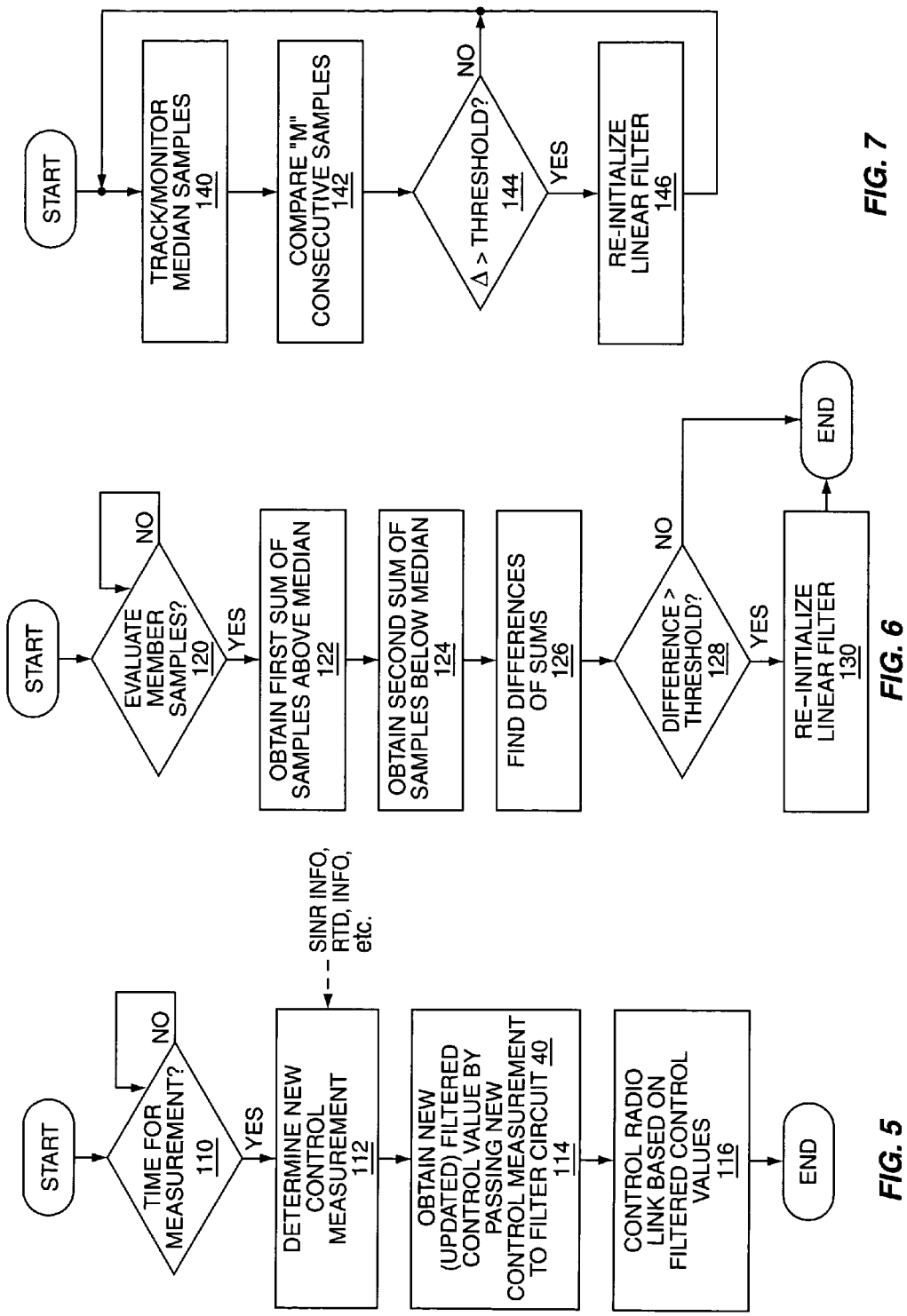

METHOD AND APPARATUS TO REDUCE MULTIPATH EFFECTS ON RADIO LINK CONTROL MEASUREMENTS

BACKGROUND OF THE INVENTION

The present invention generally relates to wireless communication systems, and particularly relates to reducing transient effects in radio link control measurements.

Various entities within wireless communication networks typically make ongoing control measurements with respect to the radio links supported by those networks. For example, base stations commonly perform ongoing measurements for each of the radio links between the base station and one or more remote mobile stations that are communicatively coupled to the base station via those radio links. Exemplary control measurements include received signal quality, e.g., strength, signal-to-interference ratio, error rate, etc., and round trip delay values.

Round trip delay measurements are key in properly managing hard handoff of the mobile stations to neighboring base stations as a function of distance, while signal quality measurements typically are used in managing radio link power and/or traffic channel data rates. Regardless of the specific control parameter or parameters being measured for the link, and regardless of the particular control response involved, the highly dynamic nature of the radio links themselves stands as a significant challenge to making such measurements in a manner that yields stable and appropriate control responses.

For example, essentially all such radio links are subject to multipath phenomena that can cause potentially dramatic and rapidly changing shifts in control measurements. Signal strength might, for example, fluctuate significantly over short periods of time in a severe fading environment. Similarly, measured round trip delay values for a given radio link might shift dramatically on an essentially instantaneous basis as the propagation path lengths change with changing fading conditions. One imagines, for example, the potentially dramatic but short lived shift in measured round trip delay values for a mobile station that quickly moves through the radio shadow of a billboard, building, hill, or other obstruction.

Some provisions generally exist for conditioning these types of control measurements with respect to measurement discontinuities arising from multipath and other phenomena. For example, in at least some instances, certain types of control measurements are subjected to simple filtering processes that average or otherwise dampen large, disruptive changes in measured control parameters. However, it is believed that such provisions fall short of effectively suppressing spurious control measurements.

SUMMARY OF THE INVENTION

The present invention comprises a method and apparatus to reduce the effects of multipath and other transients on radio link control measurements, such as round trip delay measurements, received signal power, bit error rates, etc., by passing the measurements through an N-point median filter. Median filtering in this context offers the advantage of time qualifying changes in control measurements, such that short-lived measurement transients effectively are ignored by operation of the median filter. These types of measurement transients commonly occur because of rapid propagation path changes between serving radio base stations and remote, potentially fast moving mobile stations.

Thus, an exemplary method of processing radio link control measurements for controlling a radio link in a wireless communication network comprises determining successive measurement values for a control parameter of the radio link, passing the measurement values through a filter circuit comprising an N-point median filter to obtain filtered control values, where N is an integer number, and controlling the radio link based on the filtered control values. Passing the measurement values through the filter circuit may comprise inputting successive ones of the control measurements at a desired rate to the N-point median filter and outputting median samples from the N-point median filter responsive to the input control measurements. A linear filter, such as a digital low-pass filter, may further be used to filter the output median samples such that the filtered control values comprise low-pass filtered median samples.

In one or more further exemplary embodiments, the present invention comprises a method of reducing multipath effects on radio link control measurements comprising determining control measurements based on periodically measuring one or more parameters of a radio link communicatively coupling a mobile station to a base station in a wireless communication network, time qualifying divergent control measurements by passing the control measurements through a filter that comprises an N-point median filter to thereby obtain filtered control measurements based on median sample outputs from the N-point median filter, and controlling the radio link based on the filtered control measurements such that non-persistent divergent control measurements caused by multipath effects effectively are ignored. Filtering the control measurements may further include passing the median sample outputs from the N-point filter through a linear filter to obtain the filtered control measurements used for controlling the radio link.

In at least one embodiment, the linear filter is selectively re-initialized based on evaluating the member samples of the N-point median filter, or based on evaluating the raw samples input to the median filter. Further, the size of the median filter, i.e., the magnitude of N, may be adapted. The value of N may be adapted as a function of measurement value changes or trends observed during a given call. Still further, different values of N may be used from call to call, in different radio sectors, etc., with or without adaptation.

In one or more exemplary embodiments, the present invention is implemented in a base station for use in a wireless communication network. The exemplary base station comprises one or more processing circuits configured to determine successive measurement values for a control parameter of a radio link communicatively coupling the radio base station to a remote mobile station, obtain filtered control values by passing the measurement values through an N-point median filter, where N is an integer number, and control the radio link responsive to evaluation of the filtered control values. These circuits may be implemented in hardware, in software, or in any combination thereof. In at least one embodiment, the base station comprises a radio base station that determines the control measurements, filters them, and then transfers them to a base station controller for evaluation and determination of the appropriate control response. In turn, the base station controller returns the control response to the radio base station for use in link control. In other embodiments, the radio base station performs the evaluation directly.

Of course, the present invention is not limited to the above features and advantages. Those skilled in the art will recognize additional features and advantages of the present invention upon reading the following detailed description and upon viewing the accompanying figures, in which like elements are assigned like reference numbers.

BRIEF DESCRIPTION OF THE DRAWINGS

FIG. 5 is a diagram of exemplary median filter processing logic.

FIG. 6 is a diagram of exemplary processing logic for linear filter adaptation, which may be implemented in one or more embodiments of the present invention.

FIG. 7 is a diagram of alternate exemplary processing logic for linear filter adaptation, which may be implemented in one or more embodiments of the present invention.

DETAILED DESCRIPTION OF THE INVENTION

The succeeding discussion provides various implementation and operational details in accordance with one or more embodiments of the present invention. However, it may be helpful in understanding such exemplary details to appreciate that, broadly, the present invention improves radio link control by compensating radio link control measurements for the effects of multipath and other measurement disruptions via the use of median filtering. Median filtering is a non-linear filtering process that, in exemplary form, applies a sliding window to an input signal that, in this context, comprises successive radio link control measurements.

As will be detailed later herein, a median filter rank orders its member samples and outputs the median one of those samples as its filter output. The effect of such operation effectively is to discard outlier measurements without imposing bandwidth limiting on the measurements themselves. Of course, if the control measurements undergo a sustained disruptive change, the median filter will, as its sample buffer sequentially fills with the changed control measurements, reflect that change in its median output a deterministic time later.

By virtue of this median filtering, which may be applied to any one or more of a variety of control measurements, the sort of short-lived but potentially disruptive changes in control value measurements, such as caused by rapid and severe radio channel fading, effectively are ignored. Yet, because of the advantageous application of median filtering to those values, radio link control still remains responsive to longer-term changes in the radio link conditions.

Figure 1:
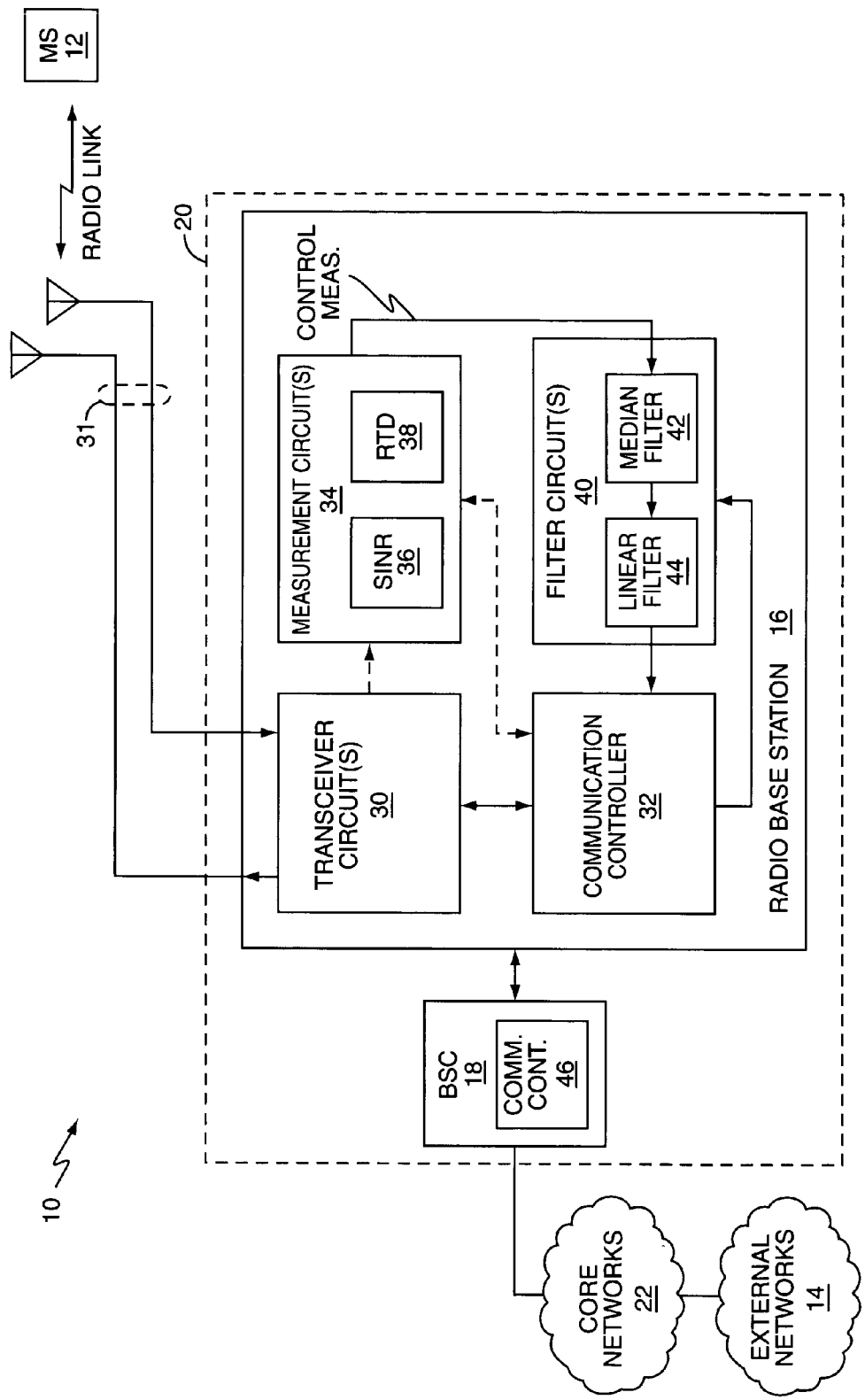
FIG. 1 is a diagram of a wireless communication network, including an exemplary base station configured according to one or more embodiments of the present invention.

With the above in mind, then, FIG. 1 illustrates a wireless communication network 10 that communicatively couples a mobile station 12 to one or more external networks 14, such as the Public Switched Telephone Network (PSTN), a Public Data Network (e.g., the Internet), etc. Network 10 includes a radio base station 16 and an associated base station controller 18, which comprise one embodiment of an exemplary base station 20. Base station 20 is communicatively coupled to the external network(s) 14 via one or more core networks 22. Core network(s) 22 may comprise, for example, circuit-switched core networks configured to carry circuit-switched voice and data traffic and/or packet-switched core networks configured to carry packet data, which may or may not include packet voice data (e.g., Voice-over-IP).

Network 10 may comprise essentially any type of wireless communication network. For example, it may be configured in accordance with Global System for Mobile communications (GSM) standards, including any of the variants thereof, such as GPRS and EDGE. Alternatively, network 10 may be configured in accordance with a code division multiple access (CDMA) standard, such as IS-95B, cdma2000, or Wideband CDMA (WCDMA). Such network configurations are identified by way of example, and the present invention is not limited to such embodiments. Further, it should be understood that the implementation of base station 20 may vary with varying network standards. For example, in cdma2000 networks, one base station controller 18 generally controls a number of radio base stations 16 and, in that context, the base station controller 18 and each radio base station 16 functionally may be considered a base station. In GSM and other networks, there may not be an explicit base station controller because such functionality at least partially may be integrated with each radio base station. In any case, as used herein, the term "base station" should be given broad construction, and should be understood to encompass a variety of functional and physical implementations.

In accordance with the exemplary but non-limiting base station illustration in FIG. 1, the present invention may be embodied in hardware, software, or any combination thereof, and may be implemented at the radio base station 16, or at the base station controller 18. Further, it may be implemented such that a portion of the exemplary processing is performed at the radio base station 16, and a portion of it performed at the base station controller 18.

With such flexibility in mind, those skilled in the art will further appreciate that network 10 is illustrated in simplified fashion for clarity of discussion, and such simplifications are not limiting with respect to the present invention. Indeed, in actual implementation, network 10 may include multiple base station controllers, or equivalent entities, each supporting any number of radio base stations, or equivalent entities. Thus, it should be understood that the overall network architecture, entity names, and entity configurations depicted herein are not limiting with respect to the present invention.

Indeed, the present invention focuses on the application of exemplary filtering techniques to one or more radio link control measurements, and thus its implementation is subject to significant variation depending on design needs and network/entity architecture. As just noted, FIG. 1 illustrates an exemplary functional implementation of radio base station 16, which comprises transceiver circuits 30 and associated transmit/receive antenna assemblies 31, a communication controller 32, measurement circuit(s) 34, which may comprise signal quality measurement circuits 36 and/or round trip delay (RTD) measurement circuits 38, and filter circuit(s) 40, which may include one or more "N-point" median filters 42, and one or more associated linear filters 44.

In operation, radio base station 16 is communicatively coupled to the remote mobile station 12 via a radio link, which may comprise any number of forward and reverse link "channels," such as pilot channels, control/signaling channels, traffic channels, etc. In an exemplary implementation of network 10, radio base station 16 controls one or more of the forward and/or reverse link channels of the radio link based on determining related control measurements for the radio link. Base station controller 18, which includes a communication controller circuit(s) 46, is configured to support such control operations.

Indeed, for certain radio link controls, radio base station 16 may make the control measurements but transfer them to base station 18 for actual evaluation (e.g., control processing). In such case, as will be detailed later herein, the exemplary median filter processing of the "raw" control measurements still may be performed by the radio base station 16, or may be performed in whole in or part by the base station controller 18. The present invention contemplates all such variations.

By way of non-limiting example, one may assume that round trip delay measurements for the radio link represent at least one of the radio control parameters of interest in the context of median filtering. By measuring the round trip delay for the radio link with respect to mobile station 12, the radio base station 16 and/or the base station controller 18 can determine whether (and when) to trigger a hard handoff of the mobile station 12 to another base station. That is, when the estimated distance of the mobile station 12 from radio base station 16 exceeds a typically pre-determined threshold, e.g., a hard handoff boundary defined around radio base station 16, it is deemed appropriate to trigger a handoff of the mobile station 12 to a base station that is closer to mobile station 12, or is otherwise considered as better positioned to serve mobile station 12.

Figure 2A:
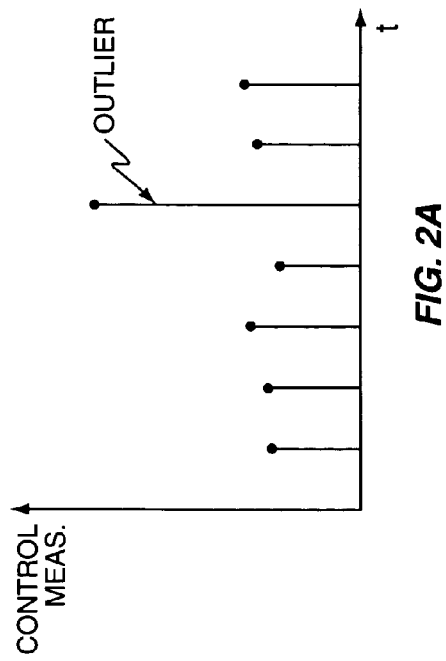
FIGS. 2A and 2B are diagrams of median filter operation with respect to outlier control measurements.

FIG. 2A illustrates "raw" control measurements, which may be assumed for this example to represent successive measurements of RTD for the radio link with mobile station 12. Such measurements may comprise CDMA "chip" times or fractional "chip" times, which easily may be converted to an estimated distance based on radio signal flight times, e.g., speed of light propagation time versus distance. By way of non-limiting example, one mechanism to determine RTD measurements for the radio link is to determine the earliest pseudo-noise code offset of signals received from the mobile station 12 at the radio base station 16. Such operations are well understood by those skilled in the art, and are based on observing the apparent time shift in the spreading code or codes used by mobile station 12 in transmitting its reverse link signals to base station 16.

Problematically, as seen in FIG. 2A, such measurements occasionally may "jump" or "fall" dramatically because of a transient change in the radio link's propagation paths, i.e., because of transient fading. Such multipath effects and other phenomena manifest themselves as potentially significant but short-lived changes in measured RTD. If left uncompensated, these "outlier" RTD measurements can result in erroneous triggering of hard handoff, which results in a potentially higher incidence of dropped calls and irregular hard handoff boundaries. That latter consequence complicates a number of network planning aspects because of the inability to reliably define the handoff boundaries around given radio base stations in the network.

Figure 3:
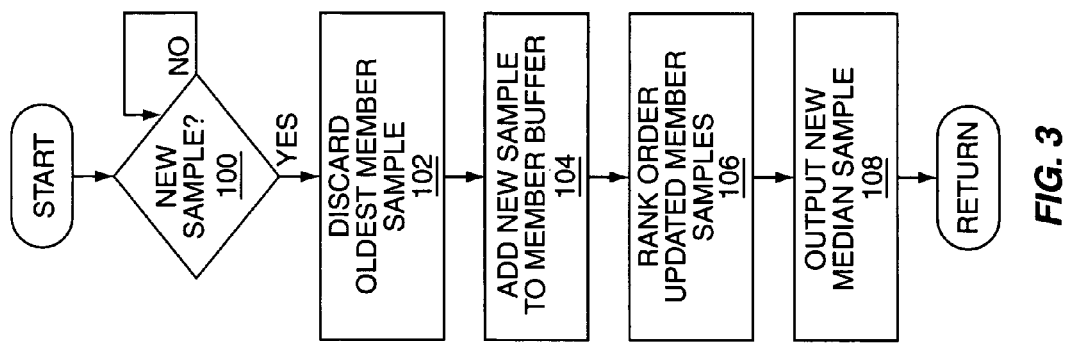
FIG. 3 is a diagram of exemplary processing logic that may be implemented to carry out median filter control value processing in accordance with one or more embodiments of the present invention.
Figure 2B:
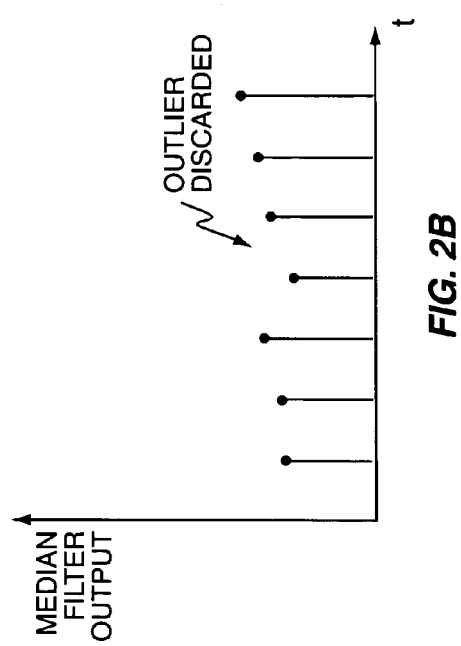

FIG. 2B illustrates exemplary compensation operation of the median filter 42 included in the radio base station 16 of FIG. 1. That is, assuming that measurement circuits 34 provide successively determined RTD measurements to filter circuit 40, FIG. 2B illustrates the median sample outputs of median filter 42 responsive to the raw control measurements of FIG. 2A. FIG. 3 illustrates exemplary operation of median filter 42, wherein processing begins with a determination of whether a new control measurement is available (Step 100). If so, median filter 42 discards its oldest member sample and adds the new control measurement to its member set of samples (Steps 102 and 104). It then rank orders the updated member set (Step 106), and outputs the new median sample (Step 108). Processing then returns to the beginning, wherein the median filter 42 is ready for the next control measurement.

As may be seen from FIG. 2B, the outlier RTD measurement effectively is discarded and the median sample outputs from median filter 42 are undisturbed by the transient disruption of measured RTD. By effectively removing outlier data without compromising measurement bandwidth, median filter 42 provides the radio base station 16 with a much improved basis for tracking the mobile station's actual distance and, therefore, with a much improved and more stable hard handoff behavior. Of course, as will be explained later, median filtering of RTD measurements is just one application of median filtering, and other control measurements may be median-filtered in addition, or in the alternative, to RTD measurements. Indeed, the mobile station 12 may be configured with an embodiment of median filter 42 for use in median filtering one or more of its radio link control measurements.

Figure 4:
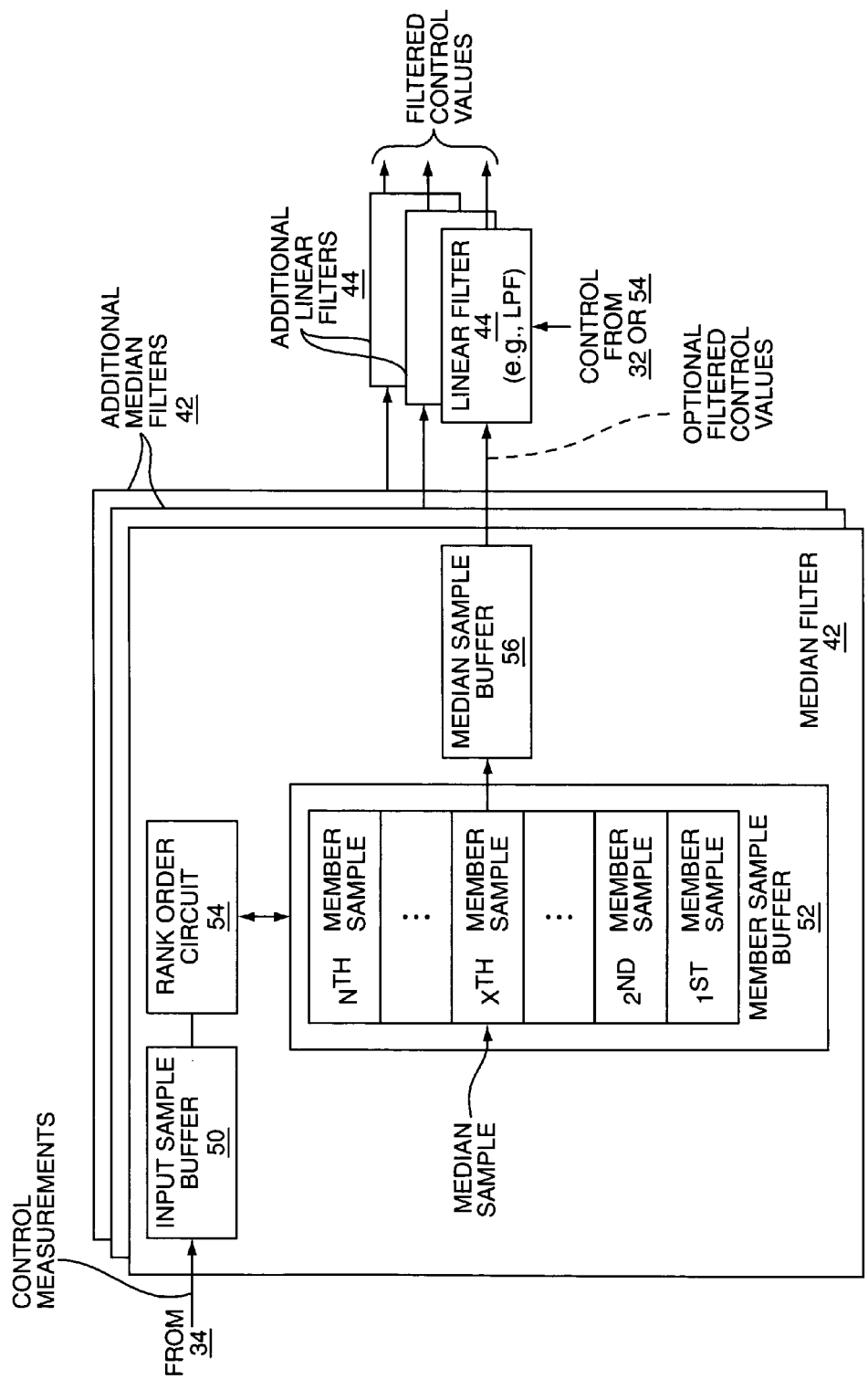
FIG. 4 is a diagram of exemplary filter circuit and corresponding median filter details, which may be implemented in the base station and/or mobile station of FIG. 1.

In supporting the above operations for RTD and/or other radio link control measurements, FIG. 4 illustrates an exemplary functional implementation of median filter 42, wherein it comprises an input sample buffer 50, a member sample buffer 52, an rank ordering circuit 54, and a median sample (output) buffer 56. The median samples output from buffer 56 may themselves be used as filtered control values, but in one or more exemplary embodiments, the median samples are passed through an additional filtering step via linear filter 44, which may be configured as a digital linear filtering implementing a low-pass filtering function, for example.

Thus, exemplary filtered control values may be obtained by passing the raw control measurements from measurement circuit 34 through median filter 42 to obtain median samples, and then passing the median samples through linear filter 44. Adding the low-pass filtering of linear filter 44, which may be implemented as an Infinite Impulse Response (IIR) filter or as a Finite Impulse Response (FIR) filter, provides an additional smoothing compensation to the median samples. The filter response, i.e., roll-off frequency of linear filter 44 may be configured as desired depending on the measurement rate of the raw control values, for example.

Further, as illustrated, filter circuit 40 may be configured with a plurality of median filter circuits 42 and corresponding linear filters 44, such that filtered control values may be obtained for any desired number of control measurements. Thus, radio base station 16 could be configured to apply exemplary filtering to one or both received signal quality measurements and RTD measurements for the radio link, and filter circuit 40 can be configured to implement functionally separate median and linear filtering for each of the control measurement sample streams. Additional median and linear filtering can be added as needed for other control measurements, such as bit, frame, or block error rate computations associated with one or more of the radio link's data channel signals. Such measurements may be considered as falling within the broad definition of received signal quality measurement, but it still may be desirable to track them separately.

Additionally, with respect to FIG. 4, it should be understood that the functional illustration of multiple median filters 42 and linear filters 44 may represent the simultaneous and independent application of such filtering to different calls being supported by the base station in which filter circuit 40 is implemented. That is, one or more streams of control measurements for each call generally is subjected to the exemplary median filtering as described herein.

Regardless, with respect to one control measurement sample stream, FIG. 4 illustrates that successive control measurements as determined by measurement circuit 34 are received by median filter 42 at its input sample buffer 50, which may be configured to buffer one or more incoming sample values. Preferably, rank ordering circuit 54 is configured to replace the oldest member sample, i.e., prior control measurements, in the member sample buffer 52 with each new sample. After thus updating the member sample buffer 52, rank ordering circuit 54 ranks the updated member sample set, with the median sample from among the rank ordered set being provided to the median sample buffer 56 for output, either to be used in formulating an updated control response, or for additional filtering via linear filter 44. As noted above, if linear filter 44 is implemented, then its filtered output is taken as the filtered control values to be used in control processing by communication controller 32 of radio base station 16 and/or by communication controller 46 of base station controller 46.

For example, base station controller 18 may be configured to manage hard handoff processing for mobile station 12, in which case radio base station 16 is configured to determine successive RTD measurements, e.g., earliest pseudo-noise (PN) code offsets for the radio link, pass those raw RTD measurements through filter circuit 40 to obtain filtered control values, and then send the filtered control values to base station controller 18 for evaluation. In turn, base station controller 18 evaluates the filtered control values, which may be received in units of distance, or converted to units of distance at the base station controller 18. The results of such evaluation, such as whether to signal the mobile station 12 that is being handed off to another radio base station, are then returned to the radio base station 16. Of course, radio base station 16 may be configured to locally evaluate the filtered control values and make the appropriate control decisions based on its own evaluation.

FIG. 5 illustrates exemplary processing logic for carrying out the signal processing operations complementing the above filtering logic, wherein processing begins with a determination of whether it is time for a new control measurement (Step 110). If so, processing continues with a determination of a new control measurement for the control parameter of interest (Step 112). On this point, it should be noted that radio base station 16 can be configured to carry out measurement, filtering, and control operations, independently for any number of control parameters, and each parameter may, if desired, use its own measurement update rate. However, it may be advantageous to determine one or more control parameters at regular intervals, such as determining a received signal-to-interference-plus-noise ratio (SINR) measurement via SINR calculator 36 and determining a RTD measurement via RTD calculator 38 for each transmit/receive communication frame.

Each new control measurement from measurement circuit 34 is passed along to the filter circuit 40 for median filtering and, optionally, subsequent linear filtering, to thereby obtain an updated corresponding filtered control value (Step 114). The updated filtered control value may then be passed to the communication controller 32 for local evaluation, or passed along by it for evaluation at the base station controller 18 (Step 116). The value of "N," which denotes the integer number of samples held in the sample buffer 52 of the median filter 42 may be set based on the control parameter being filtered. For example, in an exemplary CDMA network implementation wherein new RTD measurements are obtained on an interval from about 10 milliseconds to about 20 milliseconds (i.e., at a rate from about 50 Hz to 100 Hz), an exemplary value of N ranges from about 5 to 11. Other values of N may be more appropriate for other control parameters and can be configured as a matter of design choice.

Further, rather than fixing N to a static value, filter circuit 40 and/or controller circuit 32 may be configured to change N dynamically, such as responsive to changing radio conditions. For example, if one or more control measurements indicate that the current radio conditions are relatively poor, e.g., a SINR value below a defined threshold, a too-high frame or block error rate, etc., the radio base station 16 reasonably might have less "confidence" in the control measurements being made for the radio link. That lowered confidence may be manifested by increasing the magnitude of N, such that a more sustained disruption in the successive control measurements must occur before the median sample outputs exhibit the effects of such changes. Conversely, if the radio conditions are relatively good, the value of N may be decreased. Such increases or decreases may be evaluated at the control measurement update rate, at some fraction of that rate, or based on some other control timing.

In another exemplary approach to adapting the value of N, the magnitude of N is adapted based on the ongoing control measurement transients. If the control measurement values exhibit relatively short transient events (e.g., dips, spikes, etc.), then a relatively small value of N is sufficient to mask measurement transients. However, if the control measurement values exhibit longer-lived transient changes, then a relatively larger value of N is needed effectively to mask such deviations. As such, filter circuit 40 and/or controller 32 can be configured to monitor, or otherwise track, the raw control measurement samples input to the median filter 42, the ranked sample members in the median filter 42, or the median sample outputs, and adapt the magnitude of N in response.

Thus, for a given call, the value of N may be adapted dynamically during the call based on observing the duration of transients in the median samples, or in the raw control measurements. Further, different values of N may be used for different calls, and the value of N for each call can be adapted or not adapted independently as needed or desired. Still further, a nominal value of N can be set differently for different radio sectors, and such values may or may not be dynamically adapted during calls. For example, urban radio sectors expected to have numerous but brief radio fading events (building shadowing, etc.), may use a smaller value of N, while rural areas known or expected to have longer fading events may use a larger value of N.

Still further, the value of N and/or other information, such as linear filter averages, etc., may be passed from one base station to another as part of mobile station handoff. Such information transfer, which may or may not be implemented as a matter of design choice, can improve the starting conditions of median and linear filtering in the target base station, which receives the mobile terminal in handoff.

Regardless, according the present invention, the control responses are formulated not based on raw control measurements, but rather based on the corresponding median-filtered control measurements from which potentially disruptive outlier measurements have been discarded. Note that discarding the outliers differs significantly from simply averaging them in with the other control measurements because by discarding outliers from the control measurements their deleterious effects are eliminated rather than dampened as would occur with linear filtering alone.

In addition to that significant base advantage, a number of exemplary processing features optionally may be implemented in accordance with one or more embodiments of the present invention. For example, filter circuit 40 may be configured such that operation of the linear filter 44 is enhanced based on selectively re-initializing it. Such selective re-initialization may be performed as a function of the member samples in the median filter 42, and rank ordering circuit 54 and/or communication controller 32 may be configured to carry out such selective re-initialization. FIG. 6 illustrates exemplary re-initialization processing of linear filter 44.

In FIG. 6, processing begins with filter circuit 40 evaluating whether it is time for selective re-initialization of the linear filter circuit 44 (Step 120). Such evaluation timing control may be based on the control measurement update rate, some fraction of that rate, or based on some other control timing. If filter circuit 40 determines that re-initialization processing is timely or otherwise is desired, it obtains a first sum by summing the member samples of median filter 42 that are above the current median sample (Step 122), and obtains a second sum by summing the member samples that are below the median sample (Step 124). Filter circuit 40 (or controller 32) then finds the difference between these two sums (Step 126) and compares that difference to a defined difference threshold (Step 128). If the difference exceeds the threshold, the filter circuit (or controller 32) re-initializes the linear filter circuit 44 to the median sample value. Such re-initialization can therefore be used to ensure that that the linear filter circuit 44 is reset to more or less the middle range of the current control measurements.

With respect to the above processing logic, it was noted that selections were made above and below the median sample. On that point, it is worth noting that the median filter 42 may be implemented with essentially any value of N, including even and odd integer values. If N is odd, then the median sample literally is the middle one of the member samples, e.g., if N=5, then the third sample in rank ordering is the median sample. However, if N is even, then no single middle sample exists, and the median sample is taken as a selected one of the two "middle" samples. For example, if N=6, then the third and fourth samples together are in the middle of the rank order, and median filter 42 can be configured always to select either the lower or higher one as the median sample output. Thus, for purposes of discussion herein, the term "median sample" applies to both even and odd values of N.

In another exemplary method of linear filter re-initialization that also is contemplated by the present invention, processing logic may be configured to evaluate the median sample outputs from median filter 42 and trigger re-initialization based on that evaluation. For example, those skilled in the art will appreciate that the linear filter 44 has a designed transient response, and that it may be desirable to accelerate the convergence of the linear filter 44 responsive to determining that the control values have undergone a substantial change in value. Such a change may be detected by observing the consecutive values of median samples output from median filter 42. For example, the present invention can be configured to re-initialize linear filter 44 based on recognizing a substantial change in the median value as detected by comparing consecutive median samples output from median filter 42.

FIG. 7 illustrates exemplary processing logic to implement exemplary filter re-initialization, wherein processing "begins" with tracking, or otherwise monitoring, the median samples output by median filter 42 (Step 140). More particularly, the processing logic, which may be implemented in controller 32, or as part of filter circuit 40, compares "M" consecutive values of the median sample outputs to as a basis for triggering re-initialization of linear filter 44 (Step 142). For example, the processing logic may be configured to determine the difference between consecutive median sample outputs from median filter 42, and compare that difference (Δ) to a difference threshold (Step 144). If the delta between consecutive values exceeds the threshold, linear filter 44 is re-initialized (Step 146), and processing continues. Such initialization may be accomplished by populating the lags of the linear filter with the new median value. More particularly, if linear filter 44 is an IIR filter, the new median value can be "loaded" into the IIR feedback registers, or if linear filter 44 is an FIR filter, the historical registers can be loaded with the changed value.

Note that the above processing logic may be modified as needed or desired. For example, the value of M could be set to a value wherein the average of two or more consecutive samples is compared to the average of two or subsequent consecutive samples. Still further, essentially the same re-initialization triggering logic can be used, but applied to the raw control measurements incoming to the median filter 42, i.e., the raw control measurements can be buffered and evaluated as a basis for filter re-initialization.

Additionally, the logical implementation of median filtering may be varied or selected as a function of N. That is, if a relatively small value of N is appropriate for use in median filtering, then a relatively simple logical implementation is sufficient. For larger values of N, more sophisticated processing implementations generally are required. The implementation logic also may be varied in dependence on whether the linear filter 44 is implemented as an IIR or a FIR filter. By way of non-limiting example, the below pseudo-code illustrates exemplary logic for implementing a 3-point median filter followed by an IIR filter:

```
//Example pseudo-code:
integer median_lag_0; // last sample value
integer median_lag_1; // previous sample
integer median_lag_2; // sample from two sample periods back.
boolean initialized_median = false; // used to initialize the filter.
integer IIR_lag_1;
boolean initialized_IIR = false;
// used to initialize a single pole IIR linear filter
integer median;
// in the processing loop that accepts new samples,
we have the following code
median_lag_0 = new_sample; // this is the incoming data sample
median = find_median(median_lag_0, median_lag_1, median_lag_2);
// now update the lag values for the median filter.
median_lag_2 = median_lag_1;
median_lag_1 = median_lag_0;
if (initialized_IIR == false)
{
   IIR_lag_1 = median;
   initialized_IIR = true;
}
// now just do the IIR (in this example a single pole)
IIR_lag_1 = Coeff * median + (1 - Coeff) * IIR_lag_1;
// IIR_lag_1 is now the output value.
```

Further, by way of non-limiting example, the below pseudo-code illustrates exemplary logic for implementing an N-point (N even) median filter followed by an IIR filter:

```
// Assume we have a sort class which provide sorting (i.e. ranking) functions.
const integer N = 16;
const integer R = (N/2) - 1; // we select the "near" median
integer input_lag_buffer[N]; // this array is static somewhere in the processing module
boolean input_lags_initialized = false;
```

-continued

```
integer input_lag_0_index = 0; // an index into the input_lag_buffer;
integer sorted_buffer[N]; // also static, this is where the ranked samples go.
integer IIR_lag = 0;
boolean IIR_initialized = false;
// in the processing loop that takes in new samples we insert
    input_lag_buffer[input_lag_0_index] = newSample;
    // put the new sample in the buffer
if (Input_lags_initialized == false)
{
    for (int i = 1; i < N; i++)
    {
        input_lag_buffer[i] = newSample; // just fill the buffer with the first sample
    }
    Input_lags_initialized = true;
}
input_lag_0_index++;
input_lag_0_index %= N; // perform modulo to wrap around.
sort (input_lag_buffer, sorted_buffer); // sorted data is now in sorted_buffer
if (IIR_initialized == false)
{
    IIR_lag = newSample;
}
else
{
    IIR_lag = Coeff * newSample + (1-Coeff)*IIR_lag
}
```

Those skilled in the art will appreciate that the above pseudo-code, and variations or alternatives to such code, can be implemented in hardware, software, or some combination thereof. Indeed, those skilled in the art should appreciate that one or more of the functional elements of radio base station 16 and base station controller 18, such as those elements illustrated in FIGS. 1 and 4, may be implemented in one or more processing circuits as hardware and/or as stored program instructions comprising a computer program configured to carry out some or all of the described processing steps. To that end, the communication controller 32, measurement circuit 34, and filter circuit 40, may collectively or individually be implemented in whole or in part using hardware or software. As an example, filter circuit 40 may be implemented in one or more processing circuits, such as microprocessors, digital signal processors, ASICs, FPGAs, or the like, which are configured to carry out median filtering of one or more types of control measurements.

Therefore, the present invention should be understood not being dependent on particular variations of hardware and software. Rather, the present invention broadly encompasses the application of median filtering to radio link control measurements for purposes of eliminating or reducing the deleterious effects of outliers in those control measurements. As such, the present invention is not limited by the foregoing discussion but rather is limited only by the following claims and their reasonable equivalents.

What is claimed is:

1. A method of processing radio link control measurements for controlling a radio link in a wireless communication network, the method comprising:
   determining successive measurement values for a control parameter of the radio link;
   passing the measurement values through a filter circuit comprising an N-point median filter to obtain filtered control values, where N is an integer number, by outputting median samples from the N-point median filter responsive to inputting the successive ones of the measurement values to the N-point median filter, and filtering the median samples via a linear filter to obtain the filtered control values;
   controlling the radio link based on the filtered control; and
   selectively re-initializing the linear filter based on evaluating member samples in the N-point median filter.

2. The method of claim 1, wherein the linear filter comprises a low-pass filter such that the filtered control values comprise low-pass filtered median samples from the N-point median filter.

3. The method of claim 1, wherein selectively re-initializing the linear filter based on evaluating member samples in the N-point median filter comprises obtaining a first sum by summing the member samples above the median sample, obtaining a second sum by summing the member samples below the median sample, and re-initializing the second filter to the median sample if a difference between the first and second sums exceeds a defined difference threshold.

4. The method of claim 1, wherein passing the measurement values through a filter circuit comprising an N-point median filter to obtain filtered control values comprises providing new measurement values to the N-point median filter at a desired measurement update rate, adding each of the new measurement values to the N-point median filter as a rank ordered sample, and outputting a median one of the rank ordered samples as a new median sample.

5. The method of claim 1, wherein the radio link communicatively couples a base station and a remote mobile station, and wherein determining successive measurement values for a control parameter of the radio link comprises determining round trip delay values for the radio link at the base station.

6. The method of claim 5, wherein determining round trip delay values for the radio link at the base station comprises determining earliest pseudo-noise code offsets for mobile station signals received at the base station.

7. The method of claim 6, wherein controlling the radio link based on the filtered control values comprises controlling hard handoff triggering based on filtered control values corresponding to the earliest pseudo-noise code offsets.

8. The method of claim 6, further comprising configuring N to be in a numeric range of about 5 to about 11 where the round trip delay values are determined about every 10 to 20 milliseconds.

9. The method of claim 1, further comprising varying a magnitude of N as a function of radio link conditions.

10. The method of claim 9, wherein varying a magnitude of N as a function of radio link conditions comprises one or more of varying N as a function of round trip delay value statistics and varying N as a function of received signal quality for mobile station signals received at the base station.

11. The method of claim 1, wherein the radio link communicatively couples a base station and a remote mobile station, and wherein determining successive measurement values for a control parameter of the radio link comprises determining received signal quality measurements for mobile station signals received at the base station.

12. The method of claim 11, wherein determining received signal quality measurements for mobile station signals received at the base station comprises at least one of determining a received signal-to-noise ratio for the mobile station signals received at the base station, and determining a frame error rate for the mobile station signals received at the base station.

13. The method of claim 11, wherein controlling the radio link based on the filtered control values comprises controlling reverse link power commands being generated by the base station for the mobile station as a function of filtered control values corresponding to the received signal quality measurements.

14. The method of claim 11, wherein controlling the radio link based on the filtered control values comprises controlling a reverse link data rate of the mobile station as a function of filtered control values corresponding to the received signal quality measurements.

15. The method of claim 1, further comprising adapting the value of N as a function of the duration of transient events in the measurement values.

16. The method of claim 15, wherein adapting the value of N as a function of the duration of transient events in the measurement values comprises increasing the value of N if longer duration transients are observed in association with the measurement values, and decreasing the value of N if shorter duration transients are observed.

17. A method of reducing multipath effects on radio link control measurements comprising:
   determining control measurements based on periodically measuring one or more parameters of a radio link communicatively coupling a mobile station to a base station in a wireless communication network;
   time qualifying divergent control measurements by passing the control measurements through a filter that comprises an N-point median filter and a linear filter subsequent to the N-point median filter, to thereby obtain filtered control measurements based on passing median sample outputs from the N-point median filter through the linear filter;
   controlling the radio link based on the filtered control measurements such that non-persistent divergent control measurements caused by multipath effects effectively are ignored;
   periodically evaluating sample members of the N-point filter; and
   selectively re-initializing the linear filter responsive to that evaluation.

18. The method of claim 17, further comprising configuring the linear filter either as an Infinite Impulse Response low-pass filter, or as a Finite Impulse Response low-pass filter.

19. The method of claim 17, wherein periodically evaluating sample members of the N-point median filter and selectively re-initializing the linear filter responsive to that evaluation comprises, at a desired interval, determining a first sum by adding sample members above the median sample, determining a second sum by adding sample members below the media sample, and re-initializing the linear filter to a value of the median sample if a difference between the first and second sums exceeds a pre-defined difference threshold.

20. The method of claim 17, wherein determining control measurements based on periodically measuring one or more parameters of a radio link communicatively coupling a mobile station to a base station in a wireless communication network comprises periodically determining round trip delay values for communications between the base station and the mobile station based on periodically measuring an earliest pseudo-noise code offset of mobile station signals received at the base station.

21. The method of claim 20, wherein controlling the radio link based on the filtered control measurements comprises selectively triggering hard handoff of the mobile station based on filtered control measurements corresponding to the periodically measured earliest pseudo-noise code offsets.

22. The method of claim 17, wherein determining control measurements based on periodically measuring one or more parameters of a radio link communicatively coupling a mobile station to a base station in a wireless communication network comprises periodically determining a received signal quality measurement for mobile station signals received at the base station.

23. The method of claim 22, wherein controlling the radio link based on the filtered control measurements comprises controlling one or more of a reverse link data rate and a reverse link transmit power as a function of filtered control measurements corresponding to the periodically determined received signal quality measurement.

24. The method of claim 17, further comprising adapting the value of N based on monitoring the duration of transient events in the control measurements.

25. The method of claim 24, wherein monitoring the duration of transient events in the control measurements comprises one of monitoring samples in the median filter, monitoring the control measurements input to the median filter, or monitoring median samples output by the median filter.

26. A base station for use in a wireless communication network comprising:
   one or more processing circuits comprising:
      a measurement circuit configured to determine successive measurement values for a control parameter of a radio link communicatively coupling the base station to a remote mobile station;
      a filtering circuit configured to obtain filtered control values, comprising:
         an N-point median filter, where N is an integer number, configured to output median samples responsive to receiving successive ones of the measurement values; and
         a linear filter comprising a low-pass filter configured to obtain the filtered control valves as low-pass filtered median samples based on filtering the median samples output from the N-point median filter; and
         wherein the filtering circuit is further configured to selectively re-initialize the linear filter based on evaluating member samples in the N-point median filter; and
   wherein the one or more processing circuits are configured to control the radio link responsive to evaluation of the filtered control values.

27. The base station of claim 26, wherein the base station comprises a radio base station supporting the radio link, and including the one or more processing circuits, and further comprises a base station controller configured to receive the filtered control values from the radio base station, evaluate the filtered control values, and transmit radio link control commands to the radio base station for controlling the radio link responsive to the evaluation of the filtered control values.

28. The base station of claim 26, wherein the base station comprises a radio base station that includes the one or more processing circuits.

29. The base station of claim 26, wherein the filtering circuit is configured to selectively re-initialize the linear filter based on obtaining a first sum by summing the member samples above the median sample, obtaining a second sum by summing the member samples below the median sample, and re-initializing the second filter to the median sample if a difference between the first and second sums exceeds a defined difference threshold.

30. The base station of claim 26, wherein the measurement circuit is configured to determine the successive measurement values as round trip delay values for the radio link at the base station.

31. The base station of claim 30, wherein the measurement circuit is configured to determine the round trip delay values based on identifying earliest pseudo-noise code offsets for mobile station signals received at the base station.

32. The base station of claim 26, wherein the measurement circuit is configured to determine the successive measurement values as signal quality measurements for mobile station signal received at the base station.

33. The base station of claim 26, wherein the base station is configured to adapt the value N based on monitoring the durations of control measurement transients, such that the value of N generally is increased if longer transients are detected, and generally is decreased if shorter transients are detected.

* * * * *

UNITED STATES PATENT AND TRADEMARK OFFICE
CERTIFICATE OF CORRECTION

PATENT NO. : 7,616,927 B2  Page 1 of 1
APPLICATION NO. : 10/832890
DATED : November 10, 2009
INVENTOR(S) : Rochester, III It is certified that error appears in the above-identified patent and that said Letters Patent is hereby corrected as shown below:

In Column 10 Last line (pseudo-code), Line 64, delete "input_lags_initialized" and insert -- Input_lags_initialized --, therefor.

In Column 12, Line 27, in Claim 1, delete "control;" and insert -- control values; --, therefor.

In Column 13, Line 59, in Claim 17, delete "filter;" and insert -- median filter; --, therefor.

In Column 14, Line 5, in Claim 19, delete "media" and insert -- median --, therefor.

In Column 14, Line 57, in Claim 26, delete "valves" and insert -- values --, therefor.

Signed and Sealed this

Sixteenth Day of March, 2010

David J. Kappos
*Director of the United States Patent and Trademark Office*

UNITED STATES PATENT AND TRADEMARK OFFICE
CERTIFICATE OF CORRECTION

PATENT NO. : 7,616,927 B2
APPLICATION NO. : 10/832890
DATED : November 10, 2009
INVENTOR(S) : Lloyd Richard Rochester, III It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1597 days.

Signed and Sealed this

Nineteenth Day of October, 2010

David J. Kappos
*Director of the United States Patent and Trademark Office*